United States Patent [19]

Ishihara et al.

[11] Patent Number: 5,328,244
[45] Date of Patent: Jul. 12, 1994

[54] HEADREST DEVICE

[75] Inventors: Masao Ishihara; Tetsuo Saito; Atsushi Inoue, all of Akishima, Japan

[73] Assignee: Tachi-S Co. Ltd., Tokyo, Japan

[21] Appl. No.: 794,403

[22] Filed: Nov. 19, 1991

[30] Foreign Application Priority Data

Aug. 30, 1990 [JP] Japan .................. 2-229154

[51] Int. Cl.⁵ .................................. A47C 7/38
[52] U.S. Cl. ........................... 297/391; 297/397
[58] Field of Search ............. 297/391, 395-397

[56] References Cited

U.S. PATENT DOCUMENTS

| | | | |
|---|---|---|---|
| 3,253,859 | 5/1966 | Merriman et al. | 297/397 |
| 4,619,483 | 10/1986 | Dickey et al. | 297/397 |

FOREIGN PATENT DOCUMENTS

| | | | |
|---|---|---|---|
| 1815856 | 7/1970 | Fed. Rep. of Germany | 297/391 |
| 2856366 | 2/1980 | Fed. Rep. of Germany | 297/DIG. 6 |
| 158949 | 11/1980 | Japan . | |
| 123058 | 7/1982 | Japan . | |
| 196156 | 12/1984 | Japan . | |

*Primary Examiner*—Peter R. Brown
*Attorney, Agent, or Firm*—Oldham & Oldham

[57] ABSTRACT

A headrest device as applied to a haigh back seat, wherein a headrest body is formed independently of a seat back of the seat, and wherein a first engagement element of the headrest body is engaged with a second engagement element of the seat back, to thereby secure such separate headrest body to the seat back. This arrangement allows improvement in design, coloring and appearance for each of headrest and seat back in the high back seat.

6 Claims, 4 Drawing Sheets

HEADREST DEVICE

BACKGROUND OF THE INVENTION

1. Field of the Invention

The present invention relates to a vehicle seat, and particularly to a headrest device provided in a vehicle seat of a high back type.

2. Description of Prior Art

Recently, there has been made more available such a high back seat as shown in FIG. 1 in the vehicle seat field, in which its top part of seat back (1) is extended higher up to a point corresponding to the head of an occupant sitting on the seat. The upper end area of such high back seat is formed integrally with a headrest section (2), as is often the case with this kind of seat.

As a result of such wholly integral seat back structure, a unitary covering surface member has to be affixed over the seat back, thus resulting in becoming inferior in design and decorative effect, so that a difficulty has remained in finishing the seat back portion in a more aesthetically improved fashion.

SUMMARY OF THE INVENTION

In view of the forgoing drawbacks, it is thus a first purpose of the present invention to provide a headrest device which allows improvement in quality and aesthetic appearance in a high back seat.

For such purpose, the headrest device in accordance with the invention comprises a headrest body formed independently of a seat back of such high back seat, a first engagement means provided at the headrest body, and a second engagement means provided at a side of seat back, wherein the headrest body is assembled with the seat back by engaging the first engagement means with the second engagement means.

Accordingly, a different material and colors of covering members may be affixed over each of the headrest body and seat back, separately, thereby allowing improvement in design and aesthetic appearance of seat.

It is a second purposed of the invention to suppress an unpleasant noise in the engaged part between the headrest body and seat back.

To achieve this purpose, the first engagement means includes a securing wire coated with a resin material and the second engagement means includes a hook means to be hookingly engaged over such securing wire of first engagement means, wherein the resin coating material is adapted for suppressing a noise.

It is a third purpose of the invention to avoid a wobbling between the headrest body and seat back.

To achieve this purpose, the first engagement means of the headrest body includes a leaf spring which is so disposed as to apply a repercussive force to a frontal surface of the second engagement means, when the first and second engagement means are engaged together.

Accordingly, the leaf spring acts to absorb a wobbling which tends to occur in the loose engaged part between the headrest body and seat back.

In one aspect of the invention, the second engagement means of the seat back may be so constructed that the lower part of the securing wire is extended and formed integrally with a lower stopper which is to be secured to a sleeve of the first engagement means of the headrest body. Thus the second engagement means may be simplified in structure.

DETAILED DESCRIPTION OF PREFERRED EMBODIMENTS OF THE INVENTION

Figure 1:
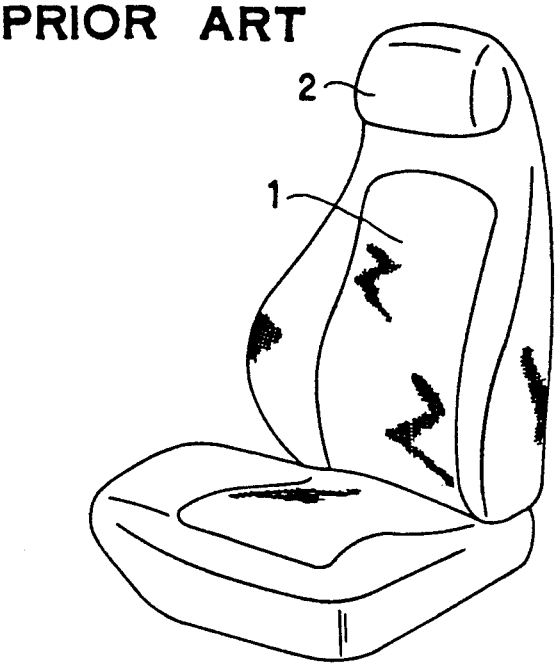
FIG. 1 is a perspective view of a conventional high back seat.
Figure 2:
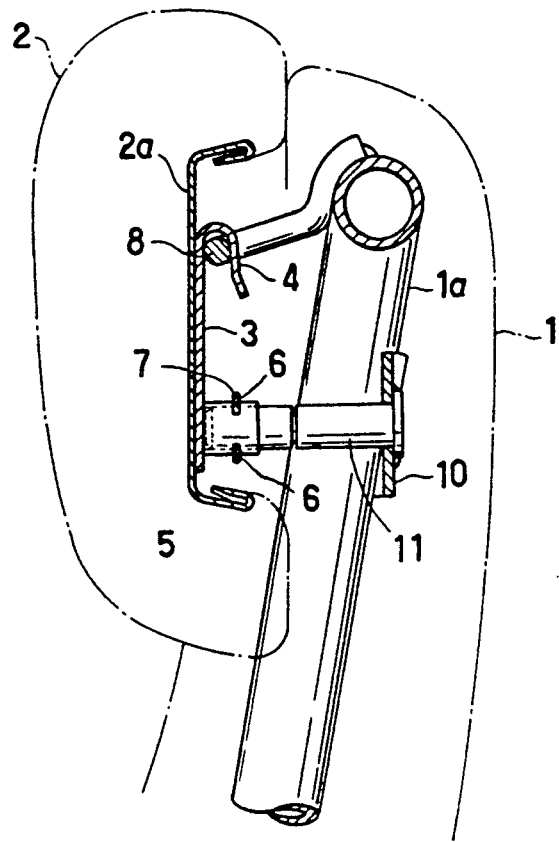
FIG. 2 is a schematic, partly broken side view of a first embodiment of headrest device applied to a high back seat in accordance with the present invention.
Figure 3:
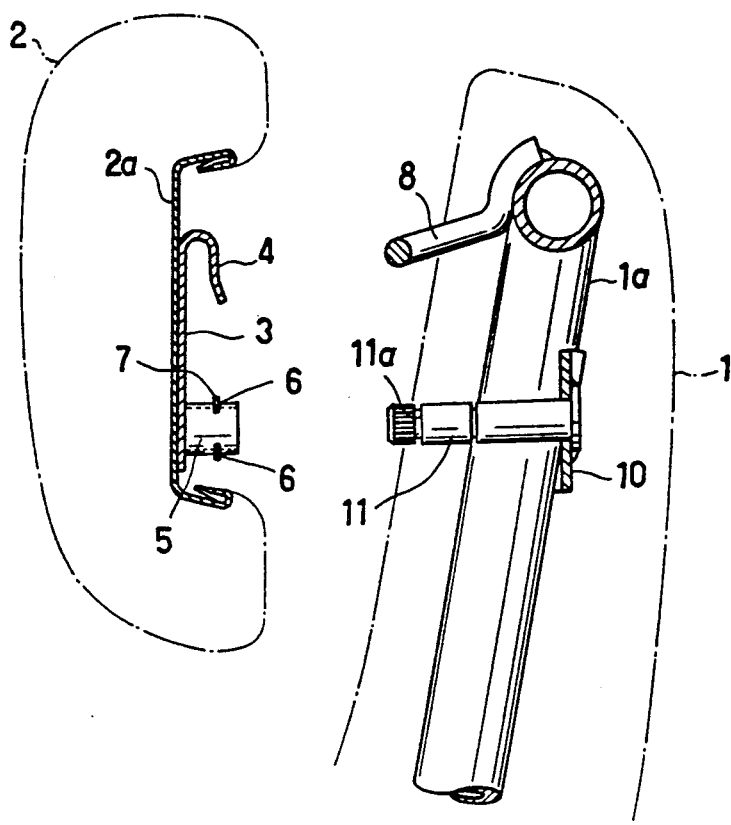
FIG. 3 is a schematic, partly broken, exploded side view of the same first embodiment as in FIG. 2.
Figure 4:
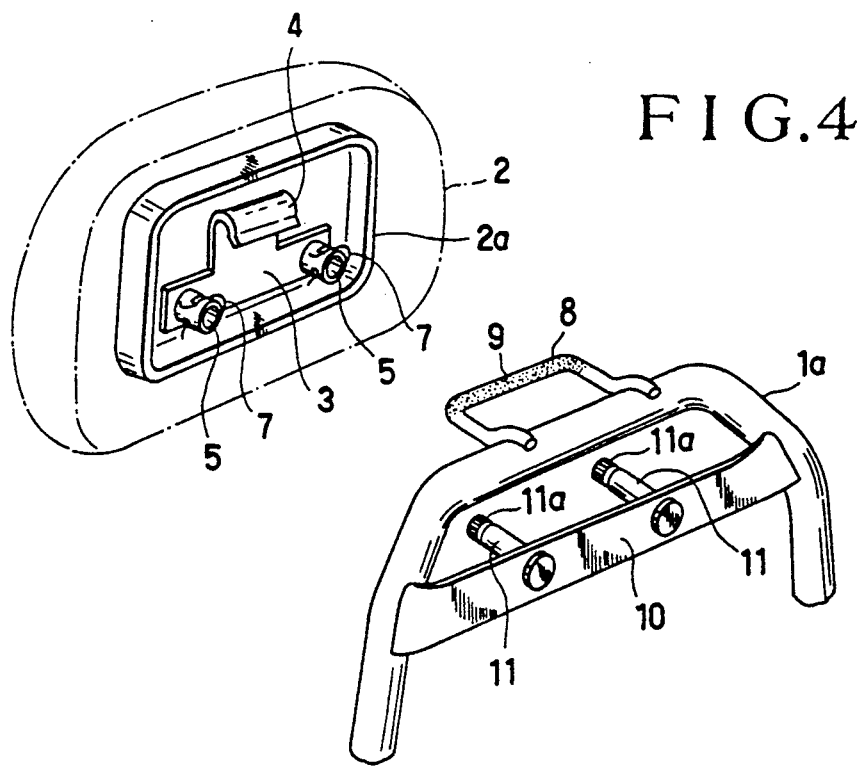
FIG. 4 is a schematic perspective view of such first embodiment as viewed from its rear side.

Reference is firstly made to FIGS. 2 to 4 which show a first embodiment of the present invention. In this embodiment, designation (1) refers to a part of seat back of high back seat as seen in FIG. 1, designation (2) refers to a headrest body. It is to be noted that the seat back (1) and headrest body (2) are formed independently of each other, and that the headrest body (2) is engaged securely to the frontal surface of upper end part of seat back (1), as will be explained later.

As illustrated, within the seat back (1), thre are provided a seat back frame (1a) made of a metallic tubular material, and within the headrest body (2), there are provided a headrest frame (2a) forming a core material for the headrest body (2) which functions as a base for permitting engagement and disengagement between the headrest body (2) and the seat back frame (1a) as will be set forth in detail below.

At the rear surface side of the headrest frame (2a) and further at its central point, there are fixedly mounted a bracket (3) which is formed at its upper end with an inverted U-shaped hook section (4) in an integral manner, and also at the lower end part of bracket (3), a pair of spaced-apart sleeves (5) made of a metallic cylindrical material are fixed, which sleeves are each formed with a notched groove (6) in the upper and lower sides thereof. A snap spring (7) of a U shape is resiliently fitted into the two sleeves (5), as shown, such that a part of the spring (7) is exposed into the hollow of the sleeve (5) through the notched groove (6).

Although not shown, a suitable padding and covering member are affixed over the frontal surface of the headrest frame (2a), excepting the rear surface formed as above, so as to provide access to the foregoing hook Section (4) and sleeves (5).

Turning to the side of seat back frame (1a), specifically stated, a U-shaped securing wire (8) is fixed on the top bar section of the seat back frame (1a) in a manner corresponding in position to the hook section (4) at the headrest body (2). As best shown in FIG. 3, the horizontal section of the wire (8) is coated with a noise suppressor material of resin. Below such securing wire (8), there is extended a transverse support plate (10) between both lateral bar sections of seat back frame (1a). Upon the support plate (10), a pair of spaced-apart stoppers (11) are mounted fast such that each of them are disposed at a point corresponding to the respective two sleeves (5). The stoppers (11) each has, formed at its forward free end, a plurality of engagement grooves (11a).

Although not shown, a suitable padding and covering member are affixed over the seat back frame (1) to form a body of seat back (1), but it should be noted that the securing wire (8) and stoppers (11) are projected through the layer of such padding and covering member for exposure outside of the seat back (1), as best seen from FIG. 3.

For assembling the above-construced headrest device, the steps consists in firstly engaging hookingly the hook section (4) over the resin-coated horizontal section of securing wire (8), and then engaging fit the two sleeves (7) with the two stoppers (11), such that the engagement grooves (11a) of stoppers (11) are inserted in the respective hollows of sleeves (5) and partly engaged with the snap rings (7). Such firm engagement between the stoppers 11 and snap springs (7) within the sleeves (5) is effective indeed for completely prevent the headrest body (2) against removal from the seat back (1).

In the first embodiment above, it is appreciated that the headrest body (2) is formed separately from the seat back (1), and as such, various different colors and patterns as well as covering members may be applied individually to each of the headrest body (2) and seat back (1), thereby materializing design and decorative improvements therein to provide a new model of high back seat. Further, the headrest body may be freely removed from the seat back for replacing its covering member by a new one with a desired colores and materials, so that a variation of design can be enjoyed at any times in an up-to-date fashion. In addition, the separation of head-rest and seat back permits better sewing of covering members into a suitable shape with a beautiful appearance.

It is important to note, further, in the present invention that, the horizontal section of wire (8) having a resin material coated thereon is well effective in suppressing noises at the assemblage of the headrest body (2) to the seat back (1) as well as noises which tend to be emitted in the engagement portion between them.

Figure 5:
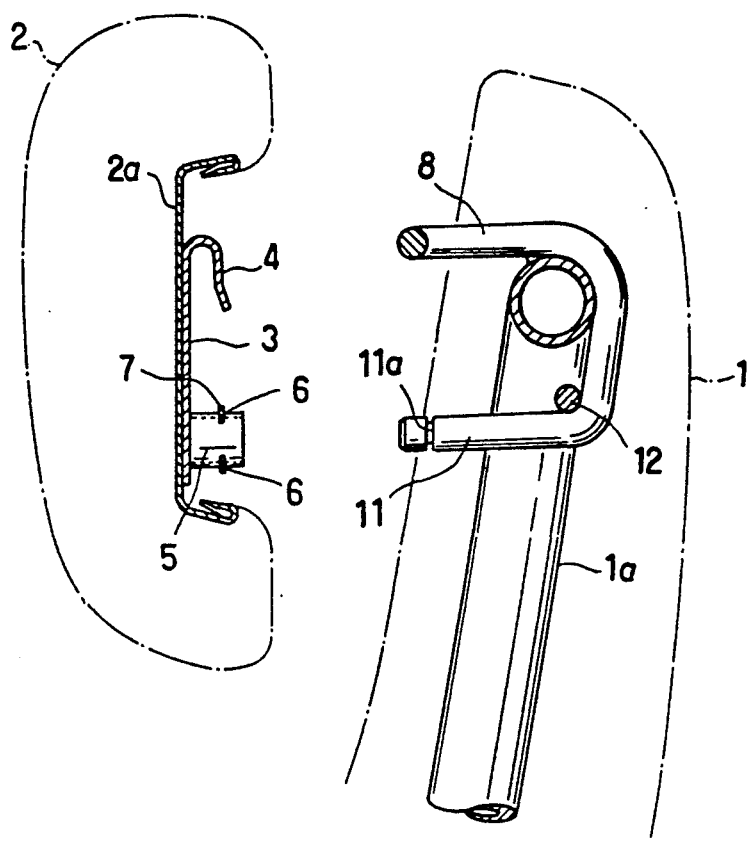
FIG. 5 is a schematic, partly broken, exploded side view of a second embodiment of the present invention.
Figure 6:
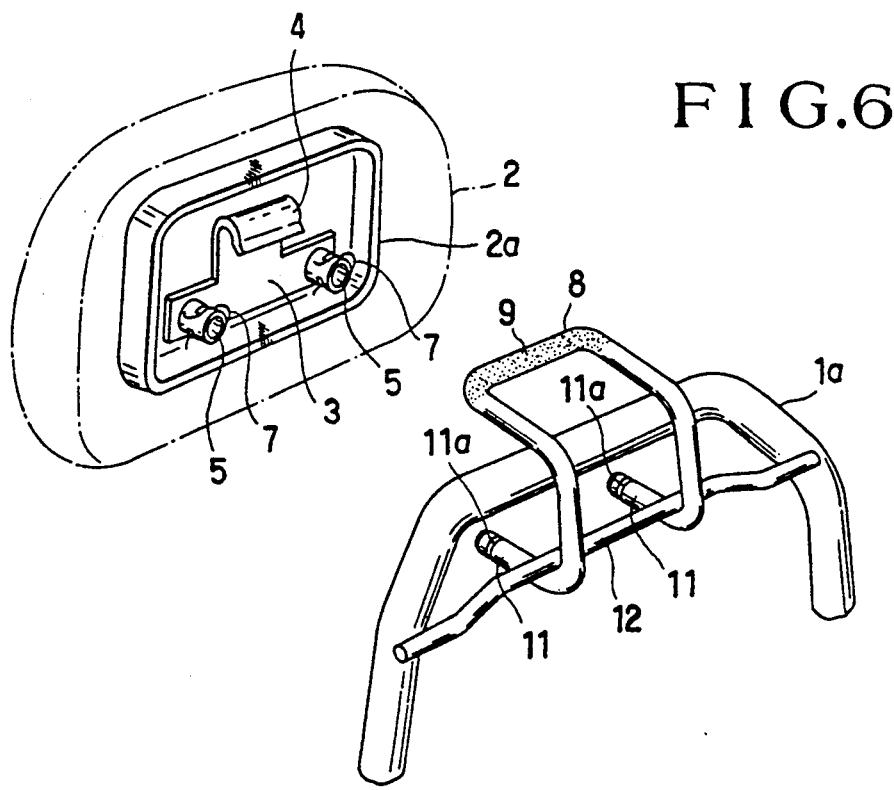
FIG. 6 is a schematic perspective view of the same second embodiment as viewed from its rear side.

FIGS. 5 and 6 show a second embodiment of the invention, wherein an improvement is made at the side of seat back frame (1a), but the headrest body in this particular embodiment is identical to that (2) in the foregoing first embodiment.

Namely, as is apparent, the U-shaped securing wire (8) in the first embodiment is modified into such structure that both lateral wire sections of wire (8) are extended and turned on the upper end section of seat cushion frame (1a) in a downward direction so as to be integrally formed with the respective two stoppers (11) of the first embodiment. Instead of the transverse support plate (10), a support wire (12) is extended between both lateral bar sections of seat back frame (1a).

Thus, as best seen from FIG. 6, an integral unit of engagement member, as equivalent to the Separately formed securing wire (8) and soppets (11), is constructed at the seat back frame (1a), wherein both lateral wire sections of wire (8) are each at its lower part bent forwardly in the same direction with that of the upper resin-coated section at (9), terminating in the engagement grooves (11a). The integral unit of wire 8 having two stoppers (11) is welded fast to the upper bar section of seat back frame (1a) and to the support wire (12). The support wire (12) serves to reinforce the stopper portions (11).

Similar to the first embodiment, the resin-coated section at 9 and stopper portions at 11 are extended through the layer of padding and covering members (not shown) for exposure outside of the seat back as shown in FIG. 5 for engagement with the head-rest body (2).

For assembling the headrest body (2) to the seat back (1), the steps are similar to those of the first embodiment, and for details, reference should be made to the foregoing embodiment.

According to the present second embodiment, it is appreciated that the integral formation of the securing wire (8) and stoppers (11) simplifies the structure of the headrest device and permits for lowering costs involved in the assemblage, in addition to the advantages attained in the first embodiment.

Figure 7:
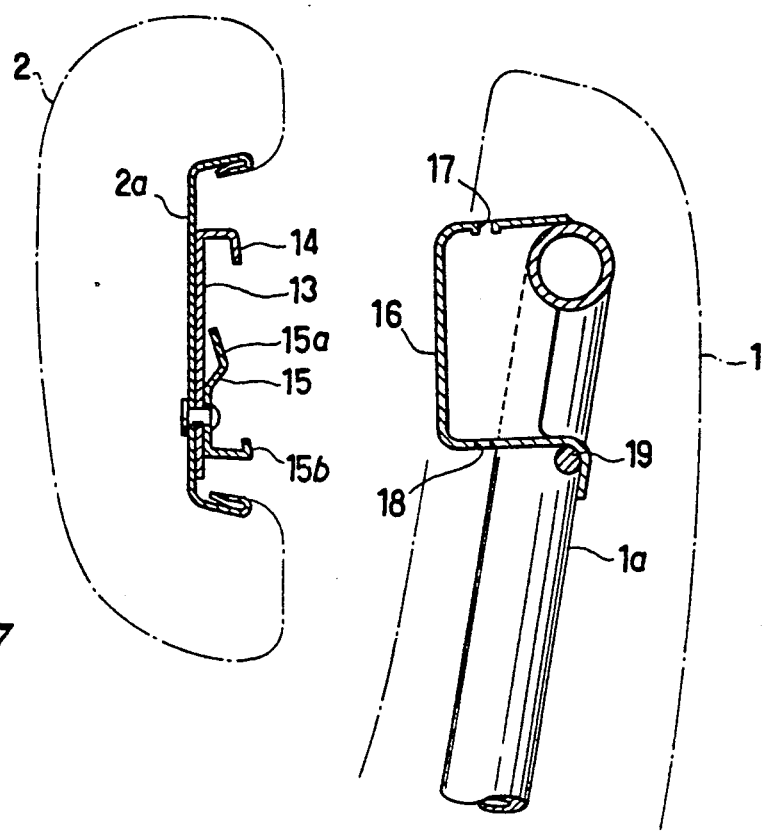
FIG. 7 is a schematic, partly broken, exploded side view of a third embodiment of the invention.
Figure 8:
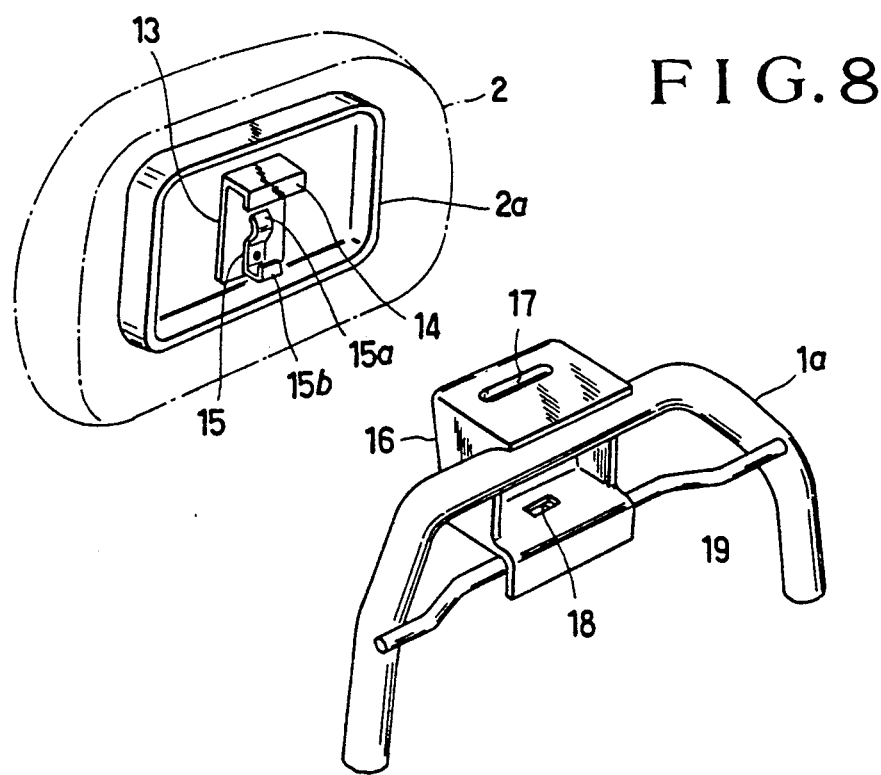
FIG. 8 is a schematic perspective view of the same third embodiment as viewed from its rear side.

FIGS. 7 and 8 show a third embodiment of the invention. In this embodiment, the headrest frame (2a) and seat back frame (1a), as well as the headrest body (2) and seat back (1), are identical to those of the first and second embodiments. But, another mode of engagement means between the headrest body (2) and seat back (1) is presented in this third embodiment. That is, as best illustrated in FIG. 8, at the rear surface side of headrest frame (2a), and further at its center point, there are fixedly provided another bracket (13) which has, formed at its upper end, an inverted U-shaped hook section (14) in an integral manner. Further, at the vertical planar section of the bracket (13), a leaf spring member (15) is fixedly secured by means of a revet (15c). The plate spring (15) is formed such that a cambered resilient part (15a) is defined at the upper end thereof, whereas a U-shaped engagement part (15b) is defined at lower end thereof.

Turning to the side of seat back frame (1a), it is seen that a box-like bracket (16) is fixedly provided thereat, which comprises an upper engagement slit (17) and a lower engagement slit (18), such that the former (17) is perforated in the upper wall of the bracket (16) and the latter (18) is perforated in the bottom wall of the same. Between both lateral bar sections of seat back frame (1a), there is extended a support wire member (19) for reinforcing the lower extension part of bracket (16). As shown, the bracket (16) per se is fixed to the upper horizontal bar section of seat back frame (1a) and to the support wire member (19).

It is to be noted here that the upper engagement slit (18) is defined at a point where the hook section (14) of bracket (13) may be inserted into the slit (17), and the lower engagement slit (18) is defined at a point wherein the engagement part (15b) of leaf spring (15) may be insert into that second slit (18).

For assembling the headrest body (2) to the seat back (1), the steps consists in firstly inserting the hook section (14) into the upper engagement slit (17), and then inserting the engagement part (15b) into the lower slit (18), whereupon the headrest body (2) is secured firmly to the seat back (1). In this connection, it is noted that after such assemblage, the cambered resilient part (15a) of leaf spring (15) is forcibly contacted with the frontal wall of bracket (16), to thereby exert its spring force thereon, so that the headrest body (2) is thereby kept pressed in a direction away from the seat back (1). This is effective in eliminating a wobbling between the headrest body (2) and seat back (1), and thus, greatly improved is the securing state of the headrest body (2) to the seat back (1).

While having described the present invention thus far, it should be finally understood that the invention is not limited to the illustrated three embodiments, but any other modifications, replacements and additions may structurally be possible without departing from the spirit and scope of the appended claims.

What is claimed is:

1. A headrest device, which is equipped at an upper end part of a seat back of a high back seat and disposed on a frontal surface thereof, comprising:
    a headrest body formed independently of said seat back;
    a first engagement means provided at one of said seat back and headrest body, said first engagement means being formed by a bracket fixed to a headrest frame of said headrest body and including an upper inverted U-shaped hook-like male engagement section formed integrally with an upper end part of said bracket and a lower engagement means; and
    a second engagement means positioned on another of said seat back and headrest body, said second engagement means including an upper U-shaped wire forming a male engagement means, to which upper U-shaped wire, said inverted U-shaped hook-like male engagement section of said first engagement means is to be hookingly engaged, and a lower engagement means which is securely engaged with said lower engagement means of said first engagement means;
    wherein one of said two lower engagement means respectively of said first and second engagement means comprises a pair of spaced-apart sleeves each including a notched groove formed therein, in which notched groove, a snap spring is resiliently fitted, while the other of said two lower engagement means comprises a pair of stoppers, each engageable into the respective said pair of spaced apart sleeves and securely engaged thereto by said snap spring,
    wherein said headrest body is assembled with said seat back by causing said inverted U-shaped hook-like male engagement section of said first engagement means to be hookingly engaged with said upper U-shaped wire, and causing said lower engagement means of said first engagement means to be securely engaged with said lower engagement means of said second engagement means, respectively.

2. The headrest device according to claim 1 wherein said U-shaped wire is coated with a resin material for suppressing a noise between said inverted U-shaped section and said U-shaped wire.

3. The headrest device according to claim 1, wherein said pair of sleeves are formed on said first engagement mean at a lower part of said bracket, and said stoppers are provided on said second engagement means, said stoppers being fixed on a support plate extending between lateral bar sections of a frame of said seat back, such that said stoppers are disposed below said U-shaped wire, and wherein said snap spring is resiliently fitted in said notched groove, with a part of said snap spring exposed in an inner hollow portion of each of said sleeves, and said headrest body is assembled with said seat back by causing said inverted U-shaped hook section to be hookingly engaged to said U-shaped wire and causing said stoppers to be securely engaged into the respective said inner hollows of said sleeves by means of said snap rings.

4. The headrest device according to claim 3, wherein said U-shaped wire has lateral wire sections and along with said pair of stoppers are formed into an integral second engagement unit which is engageable with said first engagement means, such that both lateral wire sections of said U-shaped wire are extended downwardly and integrally connected to the respective said pair of stoppers.

5. The headrest device according to claim 4, wherein said integral second engagement unit constitutes a further U-shaped wire section for engagement with said first engagement means, and wherein said further U-shaped wire section is coated with a resin material for suppressing a noise between said first engagement means and said further U-shaped wire section.

6. The headrest device according to claim 3, wherein said headrest frame includes lateral bar sections and a lower part of said integral second engagement unit is fixed to a support wire extended between said lateral bar sections of said headrest frame.

* * * * *